(12) United States Patent
Kim et al.

(10) Patent No.: US 10,969,246 B2
(45) Date of Patent: Apr. 6, 2021

(54) APPARATUS FOR SENSING ROTATING DEVICE

(71) Applicant: Samsung Electro-Mechanics Co., Ltd., Suwon-si (KR)

(72) Inventors: Hee Seung Kim, Suwon-si (KR); Soon Joung Yio, Suwon-si (KR); Jae Hyuk Jang, Suwon-si (KR); Dong Yeol Lee, Suwon-si (KR); Young Seung Roh, Suwon-si (KR); Jae Sun Won, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 49 days.

(21) Appl. No.: 16/412,683

(22) Filed: May 15, 2019

(65) Prior Publication Data

US 2020/0033160 A1    Jan. 30, 2020

(30) Foreign Application Priority Data

Jul. 27, 2018  (KR) .................. 10-2018-0088094
Oct. 12, 2018  (KR) .................. 10-2018-0121778

(51) Int. Cl.
*G01R 23/02*    (2006.01)
*G01D 5/20*     (2006.01)

(52) U.S. Cl.
CPC ................................. *G01D 5/204* (2013.01)

(58) Field of Classification Search
CPC .... G01D 5/245; G01D 5/24485; G01D 5/241; G01D 5/2415; G01D 5/2412;
(Continued)

(56) References Cited

U.S. PATENT DOCUMENTS 4,556,886 A * 12/1985 Shimizu ................ G01D 5/243
                                                    324/166
4,989,460 A *  2/1991 Mizuno ................. G01L 3/102
                                                    73/862.335
(Continued)

FOREIGN PATENT DOCUMENTS

JP         5421198 B2     2/2014
JP      2016-145729 A     8/2016
(Continued)

OTHER PUBLICATIONS

Korean Office Action dated Aug. 9, 2019 in counterpart Korean Patent Application No. 10-2018-0121778 (8 pages in English and 5 pages in Korean).

*Primary Examiner* — Thang X Le
(74) *Attorney, Agent, or Firm* — NSIP Law

(57) ABSTRACT

An apparatus for sensing a rotating body includes a unit to be detected including a first pattern portion having first patterns and a second pattern portion having second patterns, and configured to rotate around a shaft, a sensor module including a first sensor and a third sensor disposed opposite to the first pattern portion with the rotating shaft interposed therebetween, a second sensor and a fourth sensor disposed opposite to the second pattern portion with the rotating shaft interposed therebetween, and a rotation information calculator configured to calculate a first compensation sensing value based on a sum of a sensing value of the first sensor and a sensing value of the third sensor, and to calculate a second compensation sensing value based on a sum of a sensing value of the second sensor and a sensing value of the fourth sensor.

16 Claims, 7 Drawing Sheets

(58) Field of Classification Search
CPC ........ G01D 5/2417; G01D 5/206; G01D 5/14;
G01D 5/165; G01R 31/312; G01R 31/08;
G01R 31/2805; G01R 31/2812; G01R
31/2887; G01R 31/2831; G01R 27/2605;
G01R 23/02
See application file for complete search history.

(56) References Cited

U.S. PATENT DOCUMENTS

| | | | |
|---|---|---|---|
| 6,047,605 A * | 4/2000 | Garshelis | G01L 3/102 |
| | | | 73/862.336 |
| 6,341,534 B1 * | 1/2002 | Dombrowski | G01D 3/02 |
| | | | 324/209 |
| 2004/0004471 A1 | 1/2004 | Haas et al. | |
| 2009/0096302 A1 * | 4/2009 | Barada | F16C 32/0457 |
| | | | 310/90.5 |
| 2012/0268109 A1 * | 10/2012 | Mehnert | G01D 5/14 |
| | | | 324/207.15 |
| 2014/0102219 A1 * | 4/2014 | Kuwahara | B62D 5/0481 |
| | | | 73/862.333 |
| 2016/0231139 A1 | 8/2016 | Mizutani | |
| 2017/0356765 A1 * | 12/2017 | Watanabe | G01D 5/145 |
| 2019/0301893 A1 * | 10/2019 | Ruigrok | G01D 5/145 |

FOREIGN PATENT DOCUMENTS

| | | |
|---|---|---|
| KR | 2003-0040414 A | 5/2003 |
| KR | 10-1684829 B1 | 12/2016 |

\* cited by examiner

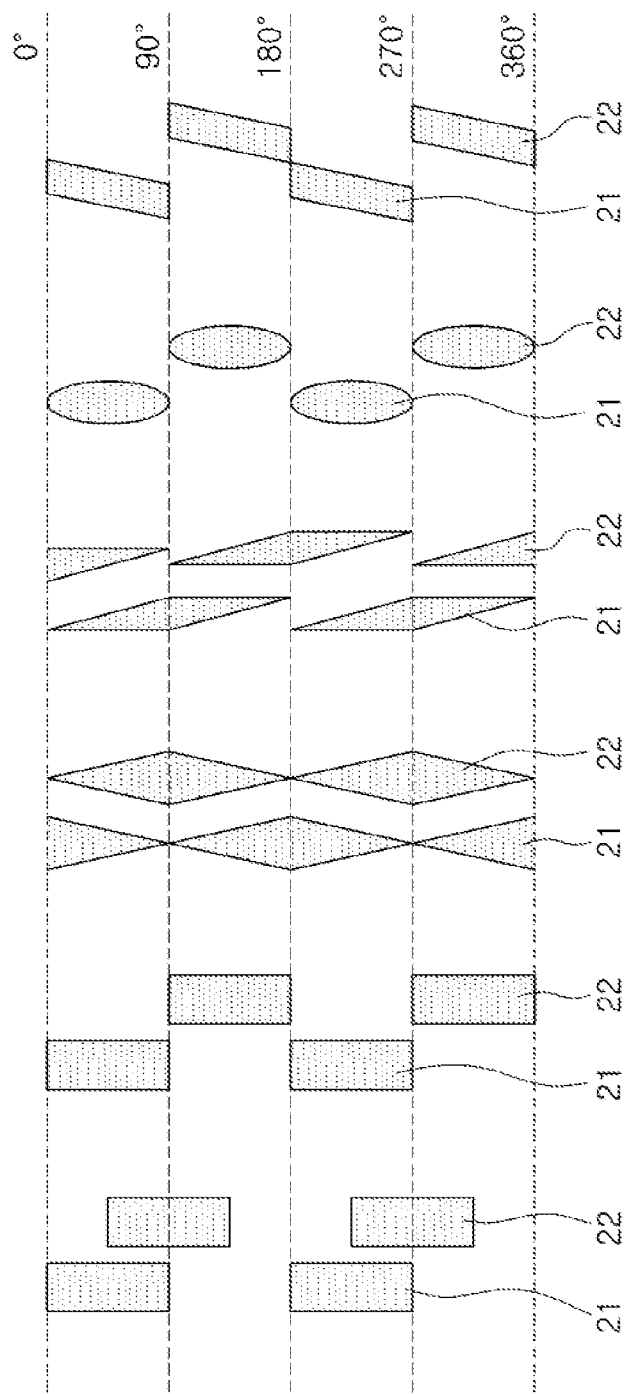

APPARATUS FOR SENSING ROTATING DEVICE

CROSS-REFERENCE TO RELATED APPLICATION(S)

This application claims the benefit under 35 U.S.C. § 119(a) of Korean Patent Application Nos. 10-2018-0088094 filed on Jul. 27, 2018 and 10-2018-0121778 filed on Oct. 12, 2018 in the Korean Intellectual Property Office, the entire disclosures of which are incorporated herein by reference for all purposes.

BACKGROUND

1. Field

The present disclosure relates to an apparatus for sensing a rotating body.

2. Description of Related Art

A rotating body is applied to various fields such as, for example, a motor, a wheel switch of a wearable device and is preferred in a miniature form with a slim profile. A sensing circuit for detecting a position of a rotating body detects a minute displacement of the rotating body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect there is disclosed an apparatus for sensing a rotating body including a first pattern portion having first patterns and a second pattern portion having second patterns, and being configured to rotate around a rotating shaft, a sensor module including a first sensor disposed opposite to the first pattern portion, a second sensor disposed opposite to the second pattern portion, a third sensor disposed opposite to the first pattern portion and disposed with the rotating shaft interposed with the first sensor, and a fourth sensor disposed opposite to the second pattern portion and disposed with the rotating shaft interposed with the second sensor, and a rotation information calculator configured to calculate a first compensation sensing value based on a sum of a first sensing value of the first sensor and a third sensing value of the third sensor, and to calculate a second compensation sensing value based on a sum of a second sensing value of the second sensor and a fourth sensing value of the fourth sensor.

The first sensing value and the third sensing value may have a same phase, and the second sensing value and the fourth sensing value may have a same phase.

The first patterns and the second patterns may have a size and a separation distance, corresponding to a reference angle.

The first patterns and the second patterns may be disposed to may have a difference in angles corresponding to half of the reference angle.

The first sensor, the second sensor, the third sensor, and the fourth sensor may have a size corresponding to a difference in angles corresponding to half of the reference angle.

The first pattern portion may include two first patterns having a size and a separation distance between the two first patterns corresponding to 90°, and the second pattern portion may include two second patterns having a size and a separation distance between the two second patterns corresponding to 90°.

According to another aspect there is disclosed an apparatus for sensing a rotating body, including a unit to be detected including a first pattern portion having first patterns and a second pattern portion having second patterns, and being configured to rotate around a rotating shaft, a sensor module including a first sensor disposed opposite to the first pattern portion, a second sensor disposed opposite to the second pattern portion, a third sensor having a difference in angles with the first sensor, and disposed opposite to the first pattern portion, and a fourth sensor having a difference in angles with the second sensor, and disposed opposite to the second pattern portion, and a rotation information calculator configured to calculate a first compensation value based on an average value of a first sensing value of the first sensor and a third sensing value of the third sensor, and to calculate a second compensation value based on an average value of a second sensing value of the second sensor and a fourth sensing value of the fourth sensor, wherein a sensing value of the first sensor and a sensing value of the third sensor have a phase difference of 180°, and a sensing value of the second sensor and a sensing value of the fourth sensor have a phase difference of 180°.

The first patterns and the second patterns may have a size and a separation distance, corresponding to a reference angle.

The first patterns and the second patterns may be disposed to have a difference in angles corresponding to half of the reference angle.

The first sensor, the second sensor, the third sensor, and the fourth sensor may have a size corresponding to a difference in angles corresponding to half of the reference angle.

The first pattern portion may include two first patterns and may have a size and a separation distance between the two first patterns corresponding to 90°, and the second pattern portion may include two second patterns having a size and a separation distance between the two second patterns corresponding to 90°.

The first sensor and the third sensor may be disposed to have a difference in angles of 90°, and the second sensor and the fourth sensor may be disposed to have a difference in angles of 90°.

The first pattern portion may include three first patterns having a size and a separation distance between each of the three first patterns corresponding to 60°, and the second pattern portion may include three second patterns having a size and a separation distance between each of the three second patterns corresponding to 60°.

The first sensor and the third sensor may be disposed to have a difference in angles of 60°, and the second sensor and the fourth sensor may be disposed to have a difference in angles of 60°.

The rotation information calculator may be configured to calculate a first compensation sensing value, by subtracting the first compensation value from the sensing value of the first sensor or the sensing value of the third sensor, and may be configured to calculate a second compensation sensing value, by subtracting the second compensation value from the sensing value of the second sensor or the sensing value of the fourth sensor.

The rotation information calculator may be configured to calculate rotation information that may include any one or any combination of a rotation direction, a rotation angle, and an angular velocity from the first compensation sensing value and the second compensation sensing value.

Other features and aspects will be apparent from the following detailed description, the drawings, and the claims.

BRIEF DESCRIPTION OF DRAWINGS

FIGS. 3A-3F are diagrams illustrating examples of a unit to be detected.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
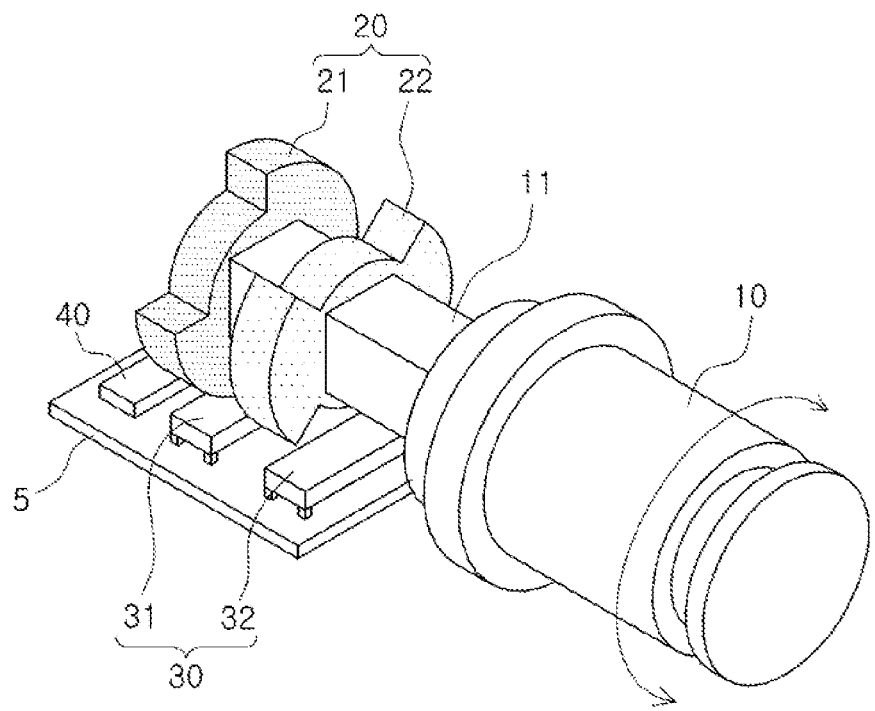
FIG. 1 is a diagram illustrating an example of an apparatus for sensing a rotating body.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. When an element is referred to as being "directly on," "directly connected to," or "directly coupled to" another element, there may be no elements or layers intervening therebetween. Like numerals refer to like elements throughout.

The terminology used herein is for describing various examples only, and is not to be used to limit the disclosure. As used herein, the term "and/or" includes any and all combinations of one or more of the associated listed items.

The use of the term "may" with respect to an example or embodiment, e.g., as to what an example or embodiment may include or implement, means that at least one example or embodiment exists in which such a feature is included or implemented while all examples and embodiments are not limited thereto.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The contents of the present disclosure described below may have a variety of configurations and propose only a required configuration herein, but are not limited thereto.

FIG. 1 is a diagram illustrating an example of an apparatus for sensing a rotating body.

The apparatus for sensing a rotating body may include a unit to be detected 20, a sensor module 30, and a rotation information calculator 40, and may further include a substrate 5.

The unit to be detected 20 may be connected to a wheel 10, through a rotating shaft 11. The wheel 10 may be a rotating body in an electronic device and rotated clockwise or counterclockwise by a user. The unit to be detected 20 may rotate together with the wheel 10 either clockwise or counterclockwise.

The unit to be detected 20 may include a first pattern portion 21 and a second pattern portion 22. The first pattern portion 21 and the second pattern portion 22 are provided to have the same shape, and may be combined with the rotating shaft 11 in an extending direction of the rotating shaft 11. The first pattern portion 21 and the second pattern portion 22 may be rotated in the same direction and at the same speed by the rotating shaft.

In an example, each of the first pattern portion 21 and the second pattern portion 22 may include patterns having the same shape. In an example, the first pattern portion 21 includes first patterns, and the second pattern portion 22 includes second patterns.

The first patterns of the first pattern portion 21 are extended in the direction of rotation, and the second patterns of the second pattern portion 22 are extended in the direction of rotation. An extension length of the first pattern portion 21 in a rotation direction of the first pattern may be defined as a size of a first pattern, and an extension length of the second pattern portion 22 in a rotation direction of the second pattern may be defined as a size of a second pattern.

The first patterns of the first pattern portion 21 are spaced apart from each other by a distance in a rotation direction, and the second patterns of the second pattern portion 22 are spaced apart from each other by another distance in a rotation direction. In an example, a separation distance of the first patterns of the first pattern portion 21 may be the same as a size of a first pattern, and a separation distance of the second patterns of the second pattern portion 22 may be the same as a size of a second pattern.

As an example, the first patterns of the first pattern portion 21 may have a size corresponding to a rotation angle of 90°, and a separation distance between the first patterns may be a rotation angle of 90°. Thus, the first pattern portion 21 may have two first patterns having a size of 90°. In a similar manner, the second patterns of the second pattern portion 22 may have a size corresponding to a rotation angle of 90°, and a separation distance between the second patterns may be a rotation angle of 90°. Thus, the second pattern portion 22 may have two second patterns having a size of 90°.

However, a size and the number of first patterns and second patterns may be changed, without departing from the spirit and scope of the illustrative examples described. As an example, the first pattern portion 21 may have three first patterns having a size of 60°, and the second pattern portion 22 may have three second patterns having a size of 60°.

Hereinafter, for convenience of explanation, it is assumed that the first pattern portion 21 has two first patterns having a size of 90°, and the second pattern portion 22 has two second patterns having a size of 90°. Moreover, it may be applied to a pattern portion having patterns in various angle sizes and various numbers described below.

In FIG. 1, a protruding region of each of the first pattern portion 21 and the second pattern portion 22 corresponds to a pattern. In an example, a disk-type metal and magnetic material is processed to form sawtooth allowing patterns to be spaced apart from each other, so the first patterns of the first pattern portion 21 and the second patterns of the second pattern portion 22 are manufactured. Thus, the first patterns of the first pattern portion 21 and the second patterns of the second pattern portion 22 may be formed of one from among a metal and a magnetic material.

In an example, the first patterns of the first pattern portion 21 and the second patterns of the second pattern portion 22 may be disposed to have a difference in angles. As an example, the first patterns of the first pattern portion 21 and the second patterns of the second pattern portion 22 may be disposed to have a difference in angles corresponding to half of a size of a first pattern and half of a size of a second pattern.

When the first pattern portion 21 has two first patterns having a size of 90° and the second pattern portion 22 has two second patterns having a size of 90°, the first patterns of the first pattern portion 21 and the second patterns of the second pattern portion 22 may be disposed to have a difference in angles of 45 degrees. Thus, some regions of the first patterns of the first pattern portion 21 and the second patterns of the second pattern portion 22 may overlap in a direction in which the rotating shaft 11 is extended.

As another example, the first patterns of the first pattern portion 21 and the second patterns of the second pattern portion 22 may be disposed to have a difference in angles corresponding to a size of a first pattern and a size of a second pattern.

When the first pattern portion 21 has two first patterns having a size of 90°, and the second pattern portion 22 has two second patterns having a size of 90°, first patterns of the first pattern portion 21 and second patterns of the second pattern portion 22 may be disposed so as to have a difference in angles of 90°. Thus, there may be no region in which the first patterns of the first pattern portion 21 and the second patterns of the second pattern portion 22 overlap in a direction in which the rotating shaft 11 is extended.

The sensor module 30 may include sensors. As an example, the sensor module 30 may include a first sensor 31 and a second sensor 32. The first sensor 31 and the second sensor 32 are disposed in an extending direction of the rotating shaft 11. The first sensor 31 is disposed opposite to the first pattern portion 21, and the second sensor 32 is disposed opposite to the second pattern portion 22.

According to rotation of the first pattern portion 21 and the second pattern portion 22, an area of the first sensor 31, overlapped with the first pattern portion 21, is changed, and an area of the second sensor 32, overlapped with the second pattern portion 22, is changed. The first sensor 31 and the second sensor 32 may detect a change in an overlapping area with the first pattern portion 21 and the second pattern portion 22.

In an example, a size of the first sensor 31 and the second sensor 32 may be of a length corresponding to a direction in which a rotating body rotates. As an example, the sizes of the first sensor 31 and the second sensor 32 may correspond to half of a first pattern of the first pattern portion 21 and a second pattern of the second pattern portion 22. In another example, the first patterns of the first pattern portion 21 and the second patterns of the second pattern portion 22 are disposed to have a difference in angles, corresponding to half of a size of a first pattern and a size of a second pattern, the sizes of the first sensor 31 and the second sensor 32 may correspond to a difference in angles of the first patterns of the first pattern portion 21 and the second patterns of the second pattern portion 22.

In an example, each of the first sensor 31 and the second sensor 32 may include a sensing coil. In an example, the sensing coil forms a circuit pattern on a substrate 5, and may be provided in the substrate 5. In an example, the sensing coil may be provided as one of a winding inductor coil and a solenoid coil. The first sensor 31 and the second sensor 32, which are provided as the sensing coil, may detect a rotation angle of a rotating body, according to inductance that is changed depending on an area overlapped with the first pattern portion 21 and the second pattern portion 22.

The rotation information calculator 40 is configured as an integrated circuit and mounted on the substrate 5, and the rotation information calculator 40 may be electrically connected to the first sensor 31 and the second sensor 32. The rotation information calculator 40 may calculate rotation information including any one or any combination of a rotation direction, a rotation angle, and an angular velocity of a rotating body depending on a change in inductance of the first sensor 31 and the second sensor 32.

Figure 2:
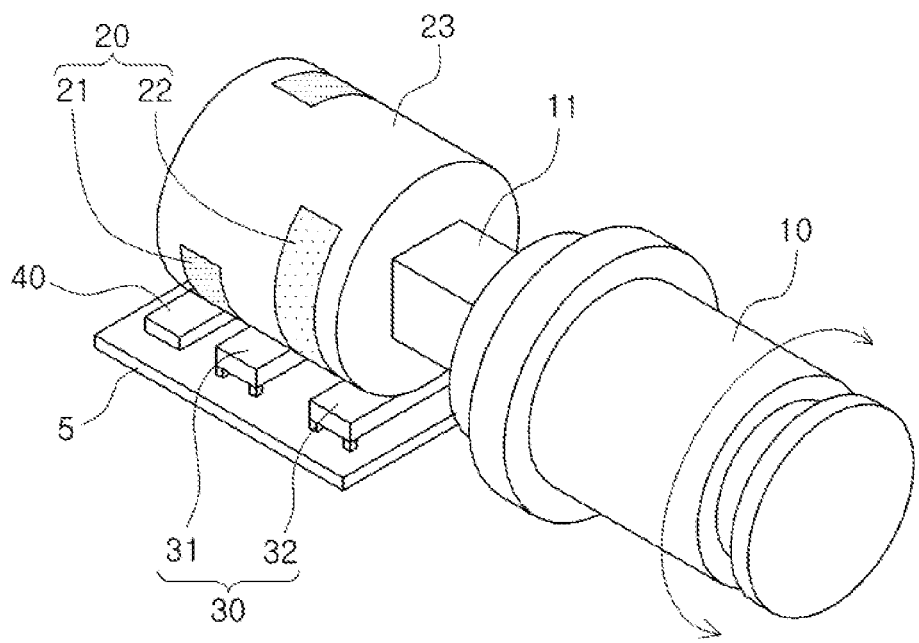
FIG. 2 is a diagram illustrating an example of an apparatus for sensing a rotating body.

FIG. 2 is a diagram illustrating an example of a modified apparatus for sensing a rotating body. An apparatus for sensing a rotating body of FIG. 2 is similar to an apparatus for sensing a rotating body of FIG. 1, so duplicate descriptions may be omitted. In addition to the description of FIG. 2 below, the descriptions of FIG. 1 are also applicable to FIGS. 2, and are incorporated herein by reference. Thus, the above description may not be repeated here.

Referring to FIG. 2, an apparatus for sensing a rotating body may further include a supporting member 23 connected to the rotating shaft 11.

The supporting member 23 is connected to the rotating shaft 11, and may rotate clockwise or counterclockwise around the rotating shaft 11 according to rotation of the wheel 10. As an example, the supporting member 23 may be provided to have a cylindrical form. The supporting member 23 may be formed of a nonmetallic material. As an example, the supporting member 23 may be formed of plastic.

A unit to be detected 20 may be disposed in the supporting member 23. The unit to be detected 20 may include a first pattern portion 21 and a second pattern portion 22, disposed on a side surface of the supporting member 23 having a cylindrical form.

The first pattern portion 21 may include first patterns extended in a rotation direction in a first height region of the supporting member 23, and the second pattern portion 22 may include second patterns extended in a rotation direction in a second height region of the supporting member 23.

Here, the first patterns of the first pattern portion 21 and the second patterns of the second pattern portion 22 may be formed of one of a metal and a magnetic material.

In an example, the supporting member 23 may be formed of a nonmetallic material such as plastic, and the first pattern portion 21 and the second pattern portion 22 may be formed of a metal. In an example, the supporting member 23 may be manufactured through an injection molding process of plastic, and the first pattern portion 21 and the second pattern portion 22 may be formed through a plating process.

In an example, the first pattern portion 21 and the second pattern portion 22 are embedded in a side surface of the supporting member 23. In an example, a groove portion is formed in a side surface of the supporting member 23, and the first pattern portion 21 and the second pattern portion 22 are disposed in the groove portion. The first pattern portion 21 and the second pattern portion 22 are disposed in the groove portion provided in a side surface of the supporting member 23, to be exposed externally. In an example, a material forming the supporting member 23 may be applied to cover the first pattern portion 21 and the second pattern portion 22.

An apparatus for sensing a rotating body is manufactured using injection molding process, a plating process, or the like, so that the apparatus for sensing a rotating body according to FIG. 2 may be advantageous for mass production and cost reduction.

In an example, the first patterns of the first pattern portion 21 are spaced apart from each other by a distance in a rotation direction, second patterns of the second pattern portion 22 are spaced apart from each other by another distance in a rotation direction, and the first patterns of the first pattern portion 21 and the second patterns of the second pattern portion 22 are disposed to have a difference in angles. However, a first pattern portion 21 and a second pattern portion 22 may be modified to have various forms for detecting a rotation angle. FIGS. 3A-3F describes some examples of a unit to be detected.

FIGS. 3A-3F are diagrams illustrating examples of a unit to be detected.

Referring to FIG. 3A, a pattern of the first pattern portion 21 and the second pattern portion 22 of the unit to be detected 20 may be formed to have a rectangular shape extended along a rotation direction. A first pattern of the first pattern portion 21 and a second pattern of the second pattern portion 22 may be disposed so as to have a difference in angles of 45°.

The first patterns of the first pattern portion 21 may have a size corresponding to a rotation angle of 90°, and a separation distance between the first patterns may correspond to a rotation angle of 90°. Moreover, the second patterns of the second pattern portion 22 may have a size corresponding to a rotation angle of 90°, and a separation distance between the second patterns may correspond to a rotation angle of 90°.

Referring to FIGS. 3B, 3E, and 3F, patterns of the first pattern portion 21 and the second pattern portion 22 may be formed to have a rectangular shape, an elliptical shape, and a parallelogram shape, extended in a rotation direction, while a first pattern of the first pattern portion 21 and a second pattern of the second pattern portion 22 may be disposed to have a difference in angles of 90°.

The first patterns of the first pattern portion 21 may have a size corresponding to a rotation angle of 90°, and a separation distance between the first patterns may correspond to a rotation angle of 90°. Moreover, the second patterns of the second pattern portion 22 may have a size corresponding to a rotation angle of 90°, and a separation distance between the second patterns may correspond to a rotation angle of 90°.

Referring to FIGS. 3C and 3D, a pattern of the first pattern portion 21 and the second pattern portion 22 is continuously arranged, and may be formed to have a rhombic shape and a trapezoidal shape, extended in a rotation direction. A pattern of the first pattern portion 21 and the second pattern portion 22 of FIGS. 3C and 3D is continuously arranged without a separation distance. In another example, a first pattern of the first pattern portion 21 and a second pattern of the second pattern portion 22 may be arranged to be shifted by half of a size of the pattern in a rotation direction.

In an example, a pattern of the first pattern portion 21 and the second pattern portion 22 is formed to have a rhombic shape and a trapezoidal shape to be continuously arranged, and a size thereof is repeatedly increased and decreased in a rotation direction periodically. Thus, due to the pattern having a rhombic shape and a trapezoidal shape, an angle may be detected.

Hereinafter, for convenience of explanation, it is assumed that a pattern of the first pattern portion 21 and the second pattern portion 22 is formed to have the shape illustrated in FIG. 3A. Here, the following description may be applied to a shape of a pattern of the first pattern portion 21 and a second pattern portion 22 according to various embodiments, such as, for example, any of the embodiments of FIGS. 3B-3F.

Figure 4A:
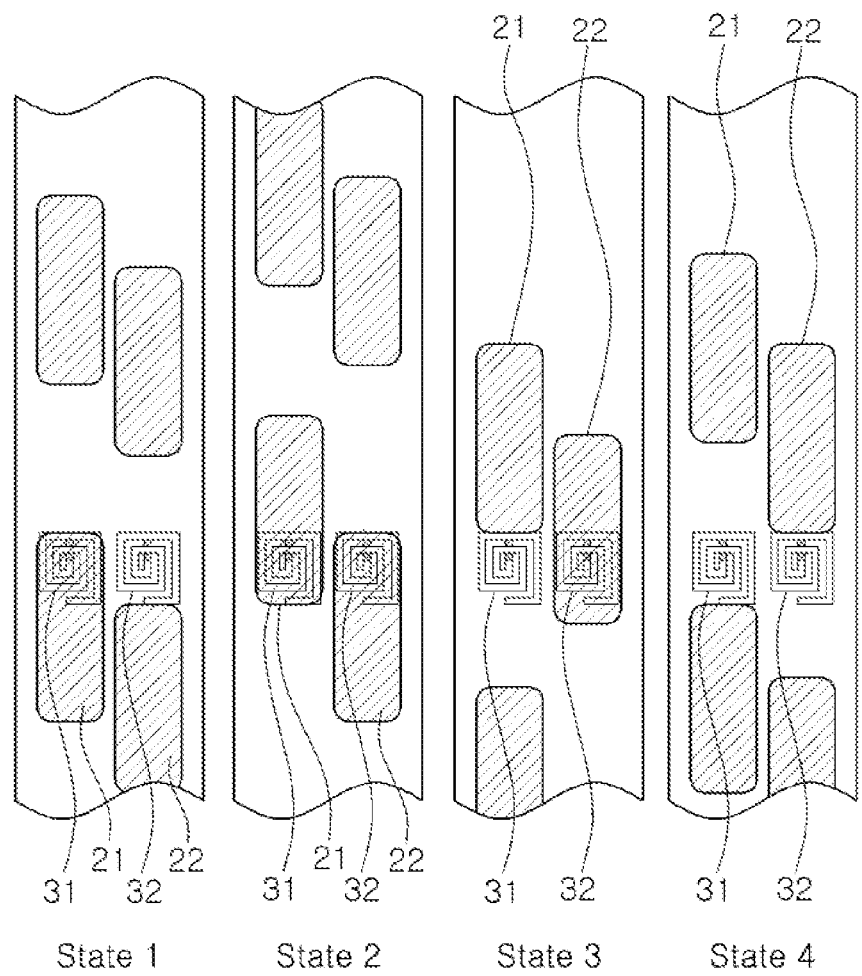
FIG. 4A is a diagram illustrating an example of a positional relationship of a unit to be detected and a sensor module according to rotation of the unit to be detected.
Figure 4B:
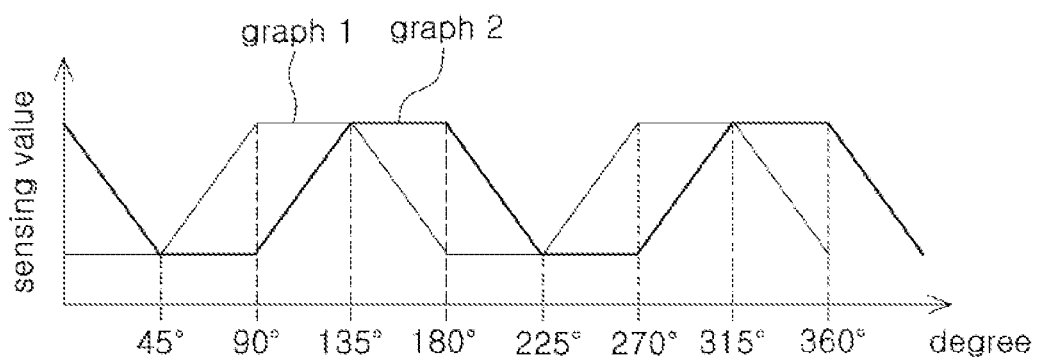
FIG. 4B is a graph illustrating an example of a sensing value measured by a sensor module according to rotation of a unit to be detected.

FIG. 4A is a diagram illustrating a positional relationship of a unit to be detected and a sensor module according to rotation of the unit to be detected, and FIG. 4B is a graph illustrating an example of a sensing value measured by a sensor module according to rotation of a unit to be detected. In FIG. 4A, a first sensor 31 and a second sensor 32 are illustrated as a sensing coil.

Referring to FIG. 4A, according to rotation of the wheel 10, an overlapping area of the unit to be detected 20 and the sensor module 30 may be changed. In detail, an overlapping area of the first pattern portion 21 and the first sensor 31 and an overlapping area of the second pattern portion 22 and the second sensor 32 may be changed. In the example of FIG. 4A, it is assumed that the first pattern portion 21 and the second pattern portion 22 rotate in a direction from a lower side to an upper side.

In a first state State 1, the first sensor 31 is overlapped with the first pattern portion 21, and the second sensor 32 is not overlapped with the second pattern portion 22. When a pattern formed of a metallic material is adjacent to the first sensor 31 including a sensing coil, a current is applied to a pattern by magnetic flux generated in the sensing coil, and magnetic flux is generated from the pattern by the current applied to the pattern. In this case, the magnetic flux, generated in the pattern, cancels the magnetic flux of the sensing coil of the first sensor 31, thereby reducing inductance of the sensing coil of the first sensor 31. Thus, referring to 0° of FIG. 4B corresponding to the first state State 1, inductance (graph 1) of the first sensor 31 is maintained at a low level, while inductance (graph 2) of the second sensor 32 is maintained at a high level.

After the first state State 1, the first pattern portion 21 and the second pattern portion 22 rotate in a direction from a lower side to an upper side. In the second state State 2, the first sensor 31 is overlapped with the first pattern portion 21, and the second sensor 32 is overlapped with the second pattern portion 22. Thus, referring to 45° of FIG. 4B corresponding to the second state State 2, the inductance (graph 1) of the first sensor 31 is maintained at a low level, and the inductance (graph 2) of the second sensor 32 is changed to a low level.

After the second state State 2, the first pattern portion 21 and the second pattern portion 22 rotate in a direction from a lower side to an upper side. In a third state State 3, the first sensor 31 is not overlapped with the first pattern portion 21, and the second sensor 32 is overlapped with the second pattern portion 22. Thus, referring to 90° of FIG. 4B corresponding to the third state State 3, the inductance (graph 1) of the first sensor 31 is changed to a high level, and the inductance (graph 2) of the second sensor 32 is maintained at a low level.

After the third state State 3, the first pattern portion 21 and the second pattern portion 21 rotate in a direction from a lower side to an upper side. In a fourth state State 4, the first sensor 31 is not overlapped with the first pattern portion 21, and the second sensor 32 is not overlapped with the second pattern portion 22. Thus, referring to 135° of FIG. 4B corresponding to the fourth state State 4, the inductance (graph 1) of the first sensor 31 is maintained at a high level, and the inductance (graph 2) of the second sensor 32 is changed to a high level.

If the user operates a wheel, due to force in the unintended direction, different from the force in a rotation direction, the unit to be detected may be displaced from a horizontal or vertical neutral position. If the unit to be detected is displaced from the horizontal or vertical neutral position, a problem occurs where the sensing sensitivity of an apparatus for sensing a rotating body is lowered. Thus, if the unit to be detected is displaced from the horizontal or vertical neutral position, the lowered sensing sensitivity may need to be compensated.

Figure 5:
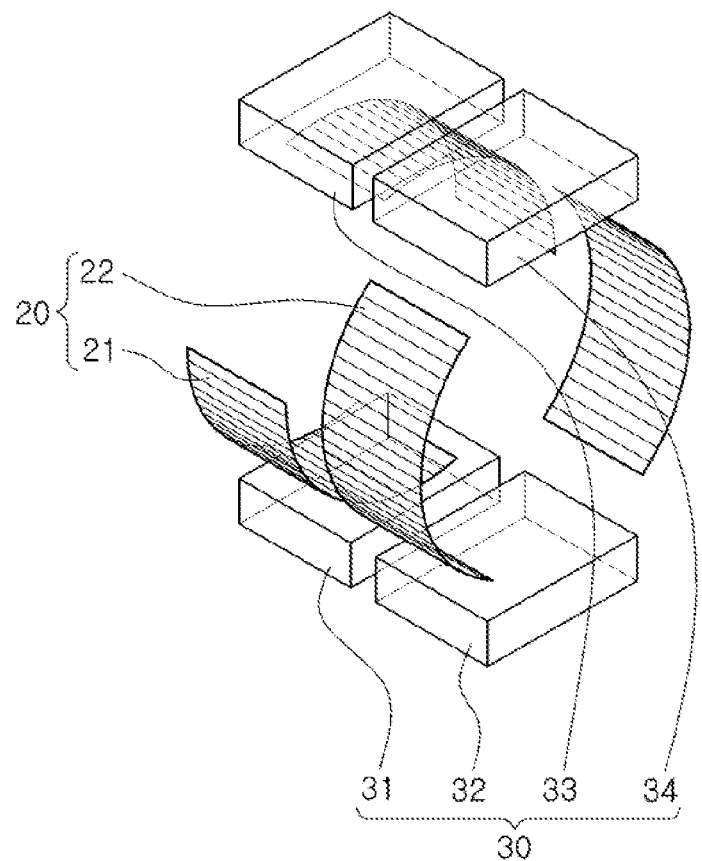
FIG. 5 is a diagram illustrating an example of an apparatus for sensing a rotating body.

FIG. 5 is a diagram illustrating an example of an apparatus for sensing a rotating body.

Since the apparatus for sensing a rotating body of FIG. 5 is similar to the apparatus for sensing a rotating body of FIGS. 1 and 2, the redundant description will be omitted and the difference will be mainly described. In addition to the description of FIG. 5 below, the descriptions of FIG. 1-2 are also applicable to FIG. 5, and are incorporated herein by reference. Thus, the above description may not be repeated here.

A sensor module 30 of the apparatus for sensing a rotating body of FIG. 5 may further include a third sensor 33 and a fourth sensor 34, as compared with the apparatus for sensing a rotating body of FIGS. 1 and 2. The third sensor 33 is provided to correspond to first patterns of the first pattern portion 21, and the fourth sensor 34 is provided to correspond to second patterns of the second pattern portion 22.

As an overlapping area of the first patterns of the first pattern portion 21 and the third sensor 33 is changed according to rotation of a rotating body, a sensing value of the third sensor 33 may be changed. In a similar manner, as an overlapping area of the second patterns of the second pattern portion 22 and the fourth sensor 34 is changed according to rotation of a rotating body, a sensing value of the fourth sensor 34 may be changed.

The third sensor 33 may be disposed so as to have a difference in angles of 180° with the first sensor 31. Thus, the third sensor 33 may be disposed to oppose the first sensor 31 with the first pattern portion 21 interposed therebetween. Moreover, the fourth sensor 34 may be disposed so as to have a difference in angles of 180° with the second sensor 32. The fourth sensor 34 may be disposed to oppose the second sensor 32 with the second pattern portion 22 interposed therebetween.

Figure 6:
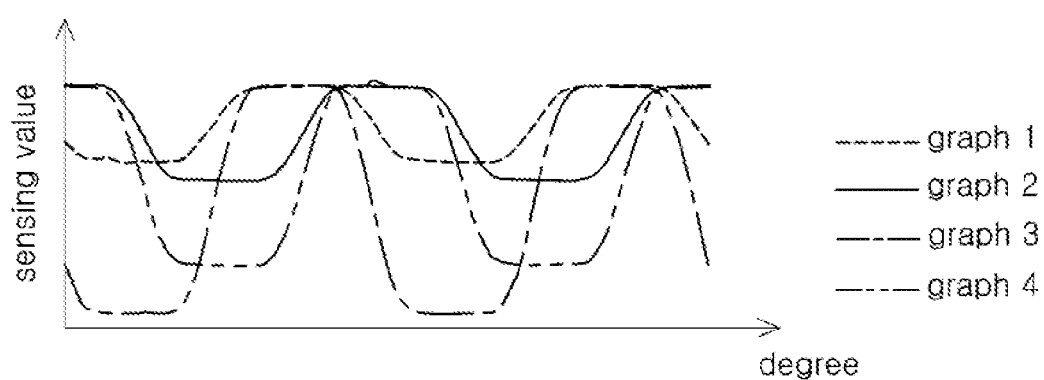
FIG. 6 is a graph illustrating an example of a sensing value of a sensor module in an embodiment of FIG. 5.

FIG. 6 is a graph illustrating an example of a sensing value of a sensor module in an embodiment of FIG. 5. A sensing value, illustrated in FIG. 6, may correspond to inductance detected when each sensor of a sensor module includes a sensing coil.

In FIG. 6, it is assumed that a rotating shaft of a rotating body is tilted in a Z-axis direction by the force of the user. Referring to FIG. 6, as a rotating shaft of a rotating body moves in a Z-axis direction, between a sensing value of a first sensor 31 and a sensing value of a third sensor 33, having the same phase, it may be confirmed that a change in a sensing value (graph 1) of the first sensor 31 is small, while a change in a sensing value (graph 3) of the third sensor 33 is high. Moreover, as the rotating shaft of the rotating body moves in a Z-axis direction, between a sensing value of a second sensor 32 and a sensing value of a fourth sensor 34, having the same phase, it may be confirmed that a change in a sensing value (graph 3) of the second sensor 32 is small, while a change in a sensing value (graph 4) of the fourth sensor 34 is large.

In other words, the sum of sensing values of the first sensor 31 and the third sensor 33 and the sum of sensing values of the second sensor 32 and the fourth sensor 34 may have a regular shape as illustrated in FIG. 4B. Thus, when the sum of sensing values of the first sensor 31 and the third sensor 33 are used as a first compensation sensing value, and the sum of sensing values of the second sensor 32 and the fourth sensor 34 are used as a second compensation sensing value, a rotating body may be precisely detected.

Thus, the rotation information calculator 40 calculates a first compensation sensing value from the sum of sensing values of the first sensor 31 and the third sensor 33, and calculates a second compensation sensing value from the sum of sensing values of the second sensor 32 and the fourth sensor 34, thereby calculating rotation information including at least one from among a rotation direction, a rotation angle, and an angular velocity of a rotating body.

In an example, the first sensor 31 and the third sensor 33 are disposed so as to have a difference in angles of 180°, and the second sensor 32 and the fourth sensor 34 are disposed so as to have a difference in angles of 180°. In this regard, even when a rotating shaft of a rotating body is dislocated from a neutral position by the force of the user, a rotating body may be precisely detected.

In the embodiment described above, the first sensor 31 and the third sensor 33 are disposed so as to have a difference in angles of 180°, and the second sensor 32 and the fourth sensor 34 are disposed so as to have a difference in angles of 180°. Thus, tilting of a rotating shaft in a direction in which the first sensor 31 and the third sensor 33 oppose each other or in a direction in which the second sensor 32 and the fourth sensor 34 oppose each other may be compensated. However, there may be a problem in which tilting in another direction could not be compensated.

Figure 7:
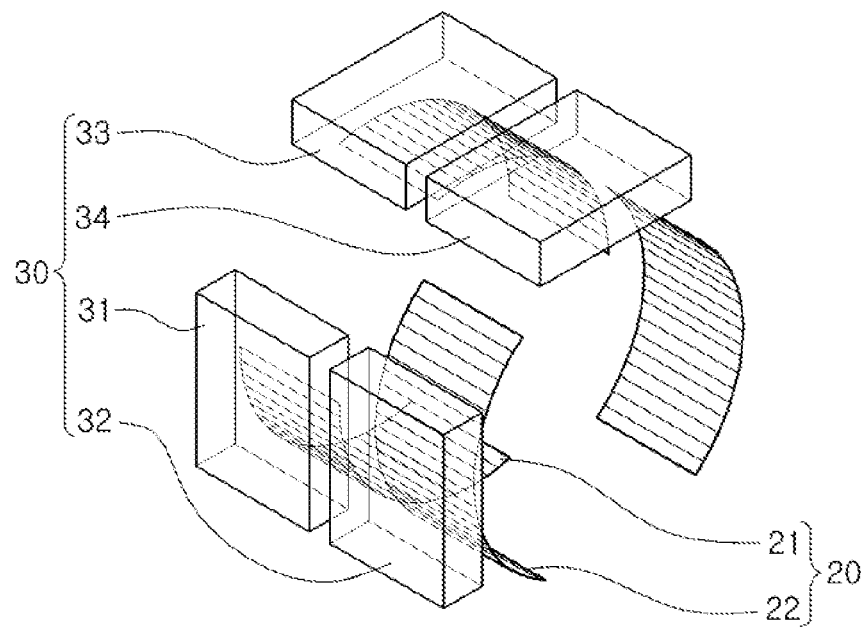
FIGS. 7 and 8 are diagrams illustrating examples of an apparatus for sensing a rotating body.
Figure 8:
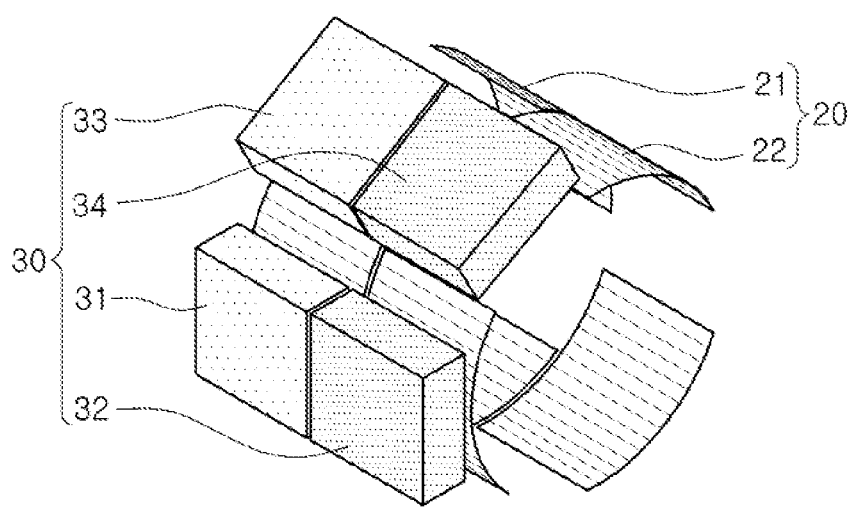

FIGS. 7 and 8 are diagrams illustrating examples of an apparatus for sensing a rotating body. Since the apparatus for sensing a rotating body of FIGS. 7 and 8 is similar to the apparatus for sensing a rotating body of FIGS. 1 and 2, the redundant description will be omitted and the difference will be mainly described. In addition to the description of FIGS. 7 and 8 below, the descriptions of FIG. 1-2 are also applicable to FIGS. 7 and 8, and are incorporated herein by reference. Thus, the above description may not be repeated here.

Referring to FIG. 7, the sensor module 30 may further include a third sensor 33 and a fourth sensor 34, as compared with the apparatus for sensing a rotating body of FIGS. 1 and 2. The third sensor 33 is provided to correspond to first patterns of the first pattern portion 21, and the fourth sensor 34 is provided to correspond to second patterns of the second pattern portion 22.

As an overlapping area of the first patterns of the first pattern portion 21 and the third sensor 33 is changed according to rotation of a rotating body, a sensing value of the third sensor 33 may be changed. In a similar manner, as an overlapping area of the second pattern portion 22 and the fourth sensor 34 is changed according to rotation of a rotating body, a sensing value of the fourth sensor 34 may be changed.

The third sensor 33 may be disposed to have a phase difference of 180° between a sensing value of the third sensor 33 and a sensing value of the first sensor 31. Moreover, the fourth sensor 34 may be disposed to have a phase difference of 180° between a sensing value of the fourth sensor 34 and a sensing value of the second sensor 32.

As described above, the first pattern portion 21 has two first patterns having a size corresponding to 90° and a separation distance corresponding to 90°, and the second pattern portion 22 has two second patterns having a size corresponding to 90° and a separation distance corresponding to 90°. In this case, as illustrated in FIG. 7, the third sensor 33 may be disposed so as to have a difference in angles of 90° with the first sensor 31, while the fourth sensor 34 may be disposed so as to have a difference in angles of 90° with the second sensor 32.

In an example, the first pattern portion 21 has three first patterns having a size corresponding to 60° and a separation distance corresponding to 60°, and the second pattern portion 22 has three second patterns having a size corresponding to 60° and a separation distance corresponding to 60°. In this case, as illustrated in FIG. 8, the third sensor 33 may be disposed so as to have a difference in angles of 60° with the first sensor 31, while the fourth sensor 34 may be disposed so as to have a difference in angles of 60° with the second sensor 32.

In other words, the third sensor 33 may be disposed so as to have a difference in angles with the first sensor 31 by a size of the first pattern or a separation distance, and the fourth sensor 34 may be disposed so as to have a difference in angles with the second sensor 32 by a size of the second pattern or a separation distance.

Figure 9:
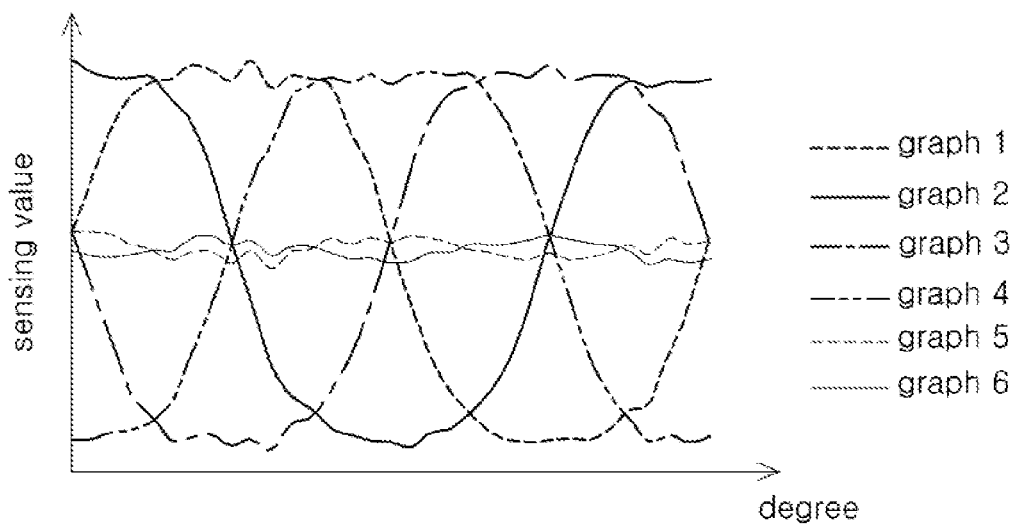
FIGS. 9 and 10 are graphs illustrating examples of a sensing value of a sensing coil according to an embodiment of FIG. 7.
Figure 10:
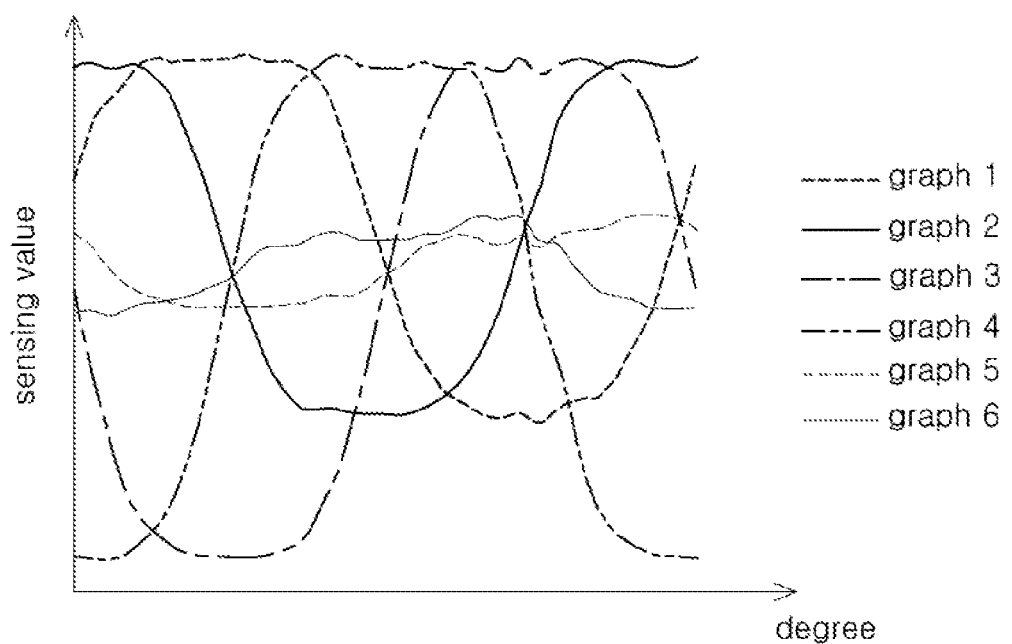
Figure 11:
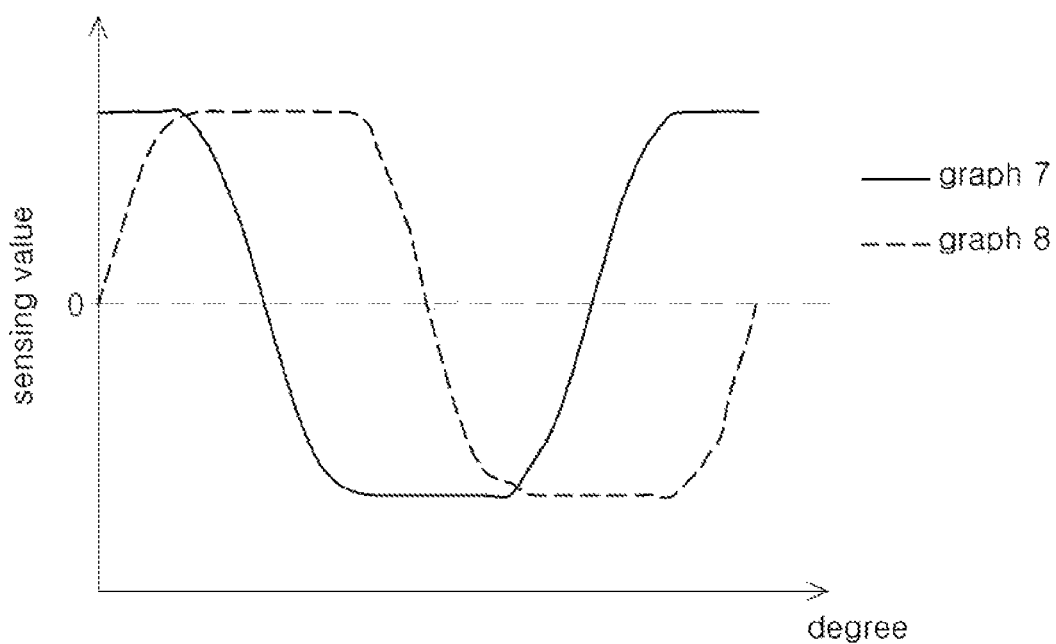
FIG. 11 is a graph illustrating an example in which a compensation value is applied to a sensing value of a sensing coil of FIG. 7.

FIGS. 9 and 10 are graphs illustrating examples of a sensing value of a sensing coil according to the embodiment of FIG. 7, and FIG. 11 is a graph in which a compensation value is applied to a sensing value of a sensing coil of FIG. 7. A sensing value, illustrated in FIGS. 9 and 10, may correspond to inductance detected when each sensor of a sensor module includes a sensing coil.

FIG. 9 illustrates a sensing value of a sensor module when a rotating shaft of a rotating body is located in a designed neutral position, and FIG. 10 illustrates a sensing value of a sensor module when a rotating shaft of a rotating body is tilted in an X-axis direction, by the force of the user.

Referring to FIGS. 9 and 10, as illustrated in FIG. 7, when the first to fourth sensors are disposed, it may be confirmed that a sensing value (graph 1) of the first sensor 31 and a sensing value (graph 3) of the third sensor 33 have a phase difference of 180°, and a sensing value (graph 2) of the second sensor 32 and a sensing value (graph 4) of the fourth sensor 34 have a phase difference of 180°.

Referring to FIGS. 10 and 11, the rotation information calculator 40 of an apparatus for sensing a rotating body sets a first average value (graph 5) of the sensing value (graph 1) of the first sensor 31 and the sensing value (graph 3) of the third sensor 33 as a first compensation value, and subtracts the sensing value (graph 1) of the first sensor 31 or the sensing value (graph 3) of the third sensor 33 from the first compensation value, to calculate a first compensation sensing value (graph 7), to which a compensation value is applied, thereby compensating for tilting of a rotating shaft.

Moreover, the rotation information calculator 40 sets a second average value (graph 6) of the sensing value (graph 2) of the second sensor 32 and the sensing value (graph 4) of the fourth sensor 34 as a second compensation value, and subtracts the sensing value (graph 2) of the second sensor 32 or the sensing value (graph 4) of the fourth sensor 34 from the second compensation value, to calculate a second compensation sensing value (graph 8), to which a compensation value is applied, thereby compensating for tilting of a rotating shaft.

As an example, the rotation information calculator 40 may calculate a compensation sensing value according to the following Equations 1 and 2. In Equation 1, Lc1 indicates a first compensation sensing value, Lx indicates a sensing value (graph 1) of the first sensor 31 or a sensing value (graph 3) of the third sensor 33, Loffset1,3 indicates a first average value (graph 5) of the sensing value (graph 1) of the first sensor 31 and the sensing value (graph 3) of the third sensor 33, and Lmax indicates a maximum value of the sensing value (graph 1) of the first sensor 31 and the sensing value (graph 3) of the third sensor 33. In Equation 2, Lc2 indicates a second compensation sensing value, Ly indicates a sensing value (graph 2) of the second sensor 32 or a sensing value (graph 4) of the fourth sensor 34, Loffset2,4 indicates a second average value (graph 6) of the sensing value (graph 2) of the second sensor 32 and the sensing value (graph 4) of the fourth sensor 34, and Lmax indicates a maximum value of the sensing value (graph 2) of the second sensor 32 and the sensing value (graph 4) of the fourth sensor 34.

$$L_{c1} = \frac{L_x - L_{offset1,3}}{L_{max} - L_{offset1,3}} \qquad \text{Equation 1}$$

$$L_{c2} = \frac{L_y - L_{offset2,4}}{L_{max} - L_{offset2,4}} \qquad \text{Equation 2}$$

As set forth above, tilting of a rotating shaft is compensated, thereby precise detection of rotation of a rotating body is possible.

An aspect of the present disclosure is to provide an apparatus for sensing a rotating body capable of compensating for tilting of a rotating shaft.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for sensing a rotating body, comprising:
a unit to be detected comprising a first pattern portion having first patterns and a second pattern portion having second patterns, and being configured to rotate around a rotating shaft;
a sensor module comprising a first sensor disposed opposite to the first pattern portion, a second sensor disposed opposite to the second pattern portion, a third sensor disposed opposite to the first pattern portion and disposed with the rotating shaft interposed with the first sensor, and a fourth sensor disposed opposite to the second pattern portion and disposed with the rotating shaft interposed with the second sensor; and
a rotation information calculator configured to calculate a first compensation sensing value based on a sum of a first sensing value of the first sensor and a third sensing value of the third sensor, and to calculate a second compensation sensing value based on a sum of a second sensing value of the second sensor and a fourth sensing value of the fourth sensor.

2. The apparatus for sensing a rotating body of claim 1, wherein the first sensing value and the third sensing value have a same phase, and the second sensing value and the fourth sensing value have a same phase.

3. The apparatus for sensing a rotating body of claim 1, wherein the first patterns and the second patterns have a size and a separation distance, corresponding to a reference angle.

4. The apparatus for sensing a rotating body of claim 3, wherein the first patterns and the second patterns are disposed to have a difference in angles corresponding to half of the reference angle.

5. The apparatus for sensing a rotating body of claim 4, wherein the first sensor, the second sensor, the third sensor, and the fourth sensor have a size corresponding to a difference in angles corresponding to half of the reference angle.

6. The apparatus for sensing a rotating body of claim 1, wherein the first pattern portion comprises two first patterns having a size and a separation distance between the two first patterns corresponding to 90°, and the second pattern portion comprises two second patterns having a size and a separation distance between the two second patterns corresponding to 90°.

7. An apparatus for sensing a rotating body, comprising:
a unit to be detected comprising a first pattern portion having first patterns and a second pattern portion having second patterns, and being configured to rotate around a rotating shaft;
a sensor module comprising a first sensor disposed opposite to the first pattern portion, a second sensor disposed opposite to the second pattern portion, a third sensor having a difference in angles with the first sensor, and disposed opposite to the first pattern portion, and a fourth sensor having a difference in angles with the second sensor, and disposed opposite to the second pattern portion; and
a rotation information calculator configured to calculate a first compensation value based on an average value of a first sensing value of the first sensor and a third sensing value of the third sensor, and to calculate a second compensation value based on an average value of a second sensing value of the second sensor and a fourth sensing value of the fourth sensor,
wherein the first sensing value of the first sensor and the third sensing value of the third sensor have a phase difference of 180°, and the second sensing value of the second sensor and the fourth sensing value of the fourth sensor have a phase difference of 180°.

8. The apparatus for sensing a rotating body of claim 7, wherein the first patterns and the second patterns have a size and a separation distance, corresponding to a reference angle.

9. The apparatus for sensing a rotating body of claim 8, wherein the first patterns and the second patterns are disposed to have a difference in angles corresponding to half of the reference angle.

10. The apparatus for sensing a rotating body of claim 9, wherein the first sensor, the second sensor, the third sensor, and the fourth sensor have a size corresponding to a difference in angles corresponding to half of the reference angle.

11. The apparatus for sensing a rotating body of claim 7, wherein the first pattern portion comprises two first patterns having a size and a separation distance between the two first patterns corresponding to 90°, and the second pattern portion comprises two second patterns having a size and a separation distance between the two second patterns corresponding to 90°.

12. The apparatus for sensing a rotating body of claim 11, wherein the first sensor and the third sensor are disposed to have a difference in angles of 90°, and the second sensor and the fourth sensor are disposed to have a difference in angles of 90°.

13. The apparatus for sensing a rotating body of claim 7, wherein the first pattern portion comprises three first patterns having a size and a separation distance between each of the three first patterns corresponding to 60°, and the second pattern portion comprises three second patterns having a size and a separation distance between each of the three second patterns corresponding to 60°.

14. The apparatus for sensing a rotating body of claim 13, wherein the first sensor and the third sensor are disposed to have a difference in angles of 60°, and the second sensor and the fourth sensor are disposed to have a difference in angles of 60°.

15. The apparatus for sensing a rotating body of claim 7, wherein the rotation information calculator is further configured to calculate a first compensation sensing value, by subtracting the first compensation value from the first sensing value of the first sensor or the third sensing value of the third sensor, and to calculate a second compensation sensing value, by subtracting the second compensation value from the second sensing value of the second sensor or the fourth sensing value of the fourth sensor.

16. The apparatus for sensing a rotating body of claim 15, wherein the rotation information calculator is further configured to calculate rotation information comprising any one or any combination of a rotation direction, a rotation angle, and an angular velocity from the first compensation sensing value and the second compensation sensing value.

* * * * *